United States Patent [19]

Krichever et al.

[11] Patent Number: 5,151,581
[45] Date of Patent: Sep. 29, 1992

[54] POINT-OF-SALE SYSTEM INCLUDING DETACHABLE INFINITELY ADJUSTABLE OPTICAL SCANNER WITH SELECTION OF SCAN PATTERN

[75] Inventors: Mark Krichever, Hauppauge; Boris Metlitsky, Stony Brook, both of N.Y.

[73] Assignee: Symbol Technologies, Inc., Bohemia, N.Y.

[21] Appl. No.: 695,076

[22] Filed: May 3, 1991

Related U.S. Application Data

[63] Continuation-in-part of Ser. No. 392,207, Aug. 10, 1989, abandoned, which is a continuation-in-part of Ser. No. 138,563, Dec. 28, 1987, Pat. No. 4,871,904.

[51] Int. Cl.$^5$ .............................................. G06K 7/10
[52] U.S. Cl. .................................... 235/467; 235/470
[58] Field of Search ................... 235/470, 472, 467

[56] References Cited

U.S. PATENT DOCUMENTS

| | | | |
|---|---|---|---|
| 3,663,800 | 5/1972 | Myer et al. ................. | 235/61.11 |
| 4,251,798 | 2/1981 | Swartz et al. ................ | 340/146.3 |
| 4,369,361 | 1/1983 | Swartz et al. ................ | 235/470 |
| 4,387,297 | 6/1983 | Swartz et al. ................ | 235/462 |
| 4,758,717 | 7/1988 | Shepard et al. .............. | 235/472 |
| 4,760,248 | 7/1988 | Swartz et al. ................ | 235/472 |
| 4,808,804 | 2/1989 | Krichever et al. ........... | 235/462 |
| 4,816,661 | 3/1989 | Krichever et al. ........... | 235/472 |
| 4,871,904 | 10/1989 | Metlitsky et al. ........... | 235/467 |
| 4,933,538 | 6/1990 | Heiman et al. .............. | 235/462 |
| 4,999,617 | 3/1991 | Uemura et al. .............. | 235/471 |
| 5,015,833 | 5/1991 | Shepard et al. .............. | 235/472 |

Primary Examiner—John W. Shepperd

[57] ABSTRACT

A point-of-sale system includes an infinitely adjustable optical scanner for reading bar code symbols, and a terminal operatively connected to the scanner. A bendable, elongated arm is operative for at least temporarily maintaining the scanner in any selected one of an infinite number of adjusted orientations relative to a work surface over which the symbols pass. A hood is mounted on the scanner for preventing overloading of a scanner photodetector. One scan pattern is selected among a plurality of scan patterns to read the indicia.

33 Claims, 8 Drawing Sheets

ONE REVOLUTION

FIG. 9
N = -2.25  K = 2

TWO REVOLUTIONS

FIG. 10
N = -2.25  K = 2

THREE REVOLUTIONS

FIG. 11
N = -2.25  K = 2

FOUR REVOLUTIONS

POINT-OF-SALE SYSTEM INCLUDING DETACHABLE INFINITELY ADJUSTABLE OPTICAL SCANNER WITH SELECTION OF SCAN PATTERN

CROSS-REFERENCE TO RELATED APPLICATIONS

This application is a continuation-in-part of application Ser. No. 07/392,207 filed Aug. 10, 1989, now abandoned which in turn, is a continuation-in-part of application Ser. No. 07/138,563 filed Dec. 28, 1987, now U.S. Pat. No. 4,871,904, and is related to pending applications Ser. Nos. 07/193,482 and 07/193,483, both filed May 11, 1988.

BACKGROUND OF THE INVENTION

1. Field of the Invention

This invention generally relates to a point-of-sale system including a terminal such as a cash register and an infinitely adjustable optical scanner, particularly for multidirectionally scanning a light-reflecting target, such as a bar code symbol, and/or the field of view of a detector and, still more particularly, to an arrangement for, and a method of, generating and positioning different scan patterns over a working surface of a workstation through which randomly-oriented bar code symbols pass over the working surface.

2. Description of Related Art

Targets having indicia of different light reflectivity, such as bar code symbols, have been scanned by directing a laser beam along an optical path to a symbol located in the vicinity of a reference plane lying generally normal to the optical path. The laser light reflected off the symbol is detected by a detector having a finite field of view. The symbols and/or the field of view have been scanned with many different scanning patterns in the reference plane. The pattern has been a single scan line, or a set of generally parallel scan lines extending in one direction lengthwise along the symbol. See U.S. Pat. Nos. 4,251,798 or 4,387,297. The pattern has also been two sets of intersecting parallel lines extending in two directions relative to the symbol. See U.S. Pat. No. 4,369,361.

In the case of randomly-oriented symbols, it has been proposed to produce a dense scanning pattern extending in multiple scanning directions in order to maximize the probability that the symbol will be quickly read, no matter what its orientation. Thus, conventional point-of-transaction or point-of-sale (POS) scanners, of the type generally found in supermarkets that have been built into and underneath check-out counters, deflect a laser beam in several directions and read symbols oriented in different directions that move across the reference plane, i.e. in the plane of or slightly above the countertop. To deflect the laser beam, a central mirrored polygon surrounded by a ring of many auxiliary mirrors is mounted below the countertop, each auxiliary mirror corresponding to a different scan line. Such constructions occupy a great deal of space and are easily accommodated under a supermarket countertop where a large amount of space is readily available. See U.S. Pat. No. 3,978,317.

It has also been proposed to generate a Lissajous scanning pattern in the reference plane. A pair of scanning elements, one deflecting a laser beam in the X-direction, and the other deflecting the laser beam in the Y-direction, are sinusoidally driven simultaneously to form a closed curved scan pattern. Although curved, the Lissajous pattern includes an interior central portion characterized by generally linear scan lines essentially orthogonally intersecting each other to form an X shape, and exterior portions characterized by sharply curved scan lines having small radii of curvature. Since such lightly curved scan lines are not useful for symbol reading, they are typically cut off, usually by sizing the exit window through which the outgoing laser beam passes en route to a symbol so as to permit passage therethrough of only the interior central portion of the Lissajous pattern, but to block the exterior portions thereof.

In order to generate truly multidirectional scan patterns, the use of holographic scanners was proposed in an article entitled "Multidirectional Holographic Scanner for Point-Of-Sale Bar-Code Symbol Reader", published in Optical Engineering, Nov.–Dec. 1984, Vol. 23, No. 6, p. 784ff. A holographic disc was rotated at one speed, and a laser beam incident on the disc was reversely rotated at another speed. The resultant outgoing beam had multidirectional scan lines. However, in the context of designing bar code symbol readers which are hand-held, or mounted on a support surface, where the available space is at a premium, and where it is desired to keep the overall size, weight and volume of the reader to a minimum, holographic discs are not practical. The holographic disc of said article is 200 mm in diameter—too big to provide the compactness desired in many applications for portable scanners; has an optical path of 350 mm—too long for many applications; and has a scan angle of ±10°—too inadequate to achieve the compactness and the length of the scan desired in many applications.

The above-described scan patterns were produced by scan pattern generators comprised of electrical and optical components mounted in housings of various shapes, e.g. a gun shaped head (see U.S. Pat. No. 4,251,798 or 4,409,470), or a box-like head (see U.S. Pat. No. 4,369,361). The gun-shaped head was held in an operator's hand, and was typically connected by a cable to a remote terminal containing additional components which together comprised a laser scanning system. The terminal could either be hand-held, carried by a harness worn by the operator, or stationarily mounted, e.g. either as a stand-alone unit or within a cash register. The box-like head was also typically connected by a cable to such a remote terminal, and was supported above a countertop or like support surface to constitute a stand-alone, desk-top workstation through which objects bearing symbols passed.

Although the hand-held heads were readily movable relative to the symbols to be read, the workstation heads were more limited in terms of their freedom of movement. It was proposed to pivot the workstation heads about fixed pivots, and to move the heads linearly along a fixed path toward and away from the symbols. However, there were times when a symbol did not, or at least not readily, register with the scan pattern emitted from the workstation head, in which event, the operator would attempt to pass the symbol through the workstation again and again, thereby decreasing reading throughput. Also, there were times when ambient light in the vicinity of the workstation head was so bright that the ambient light tended to mask the reflected laser light collected by the head, thereby again decreasing system efficiency.

Also, no provision was made for changing the scan pattern. Different symbols might be more readily read by different scan patterns.

SUMMARY OF THE INVENTION

1. Objects of the Invention

It is a general object of this invention to overcome the drawbacks, and advance the state of the art, of optical workstation-type scanners, particularly bar code symbol reading workstations.

It is another object of this invention to provide a point-of-sale or point-of-transaction system including a workstation-type head capable of being infinitely adjustably positionable relative to the symbols being scanned and passed through the workstation.

Yet another object of this invention is to generate and position a multi-directional scan pattern substantially over the entire working surface in a workstation, across which working surface the symbols to be read are passed.

Another object of this invention is to sense the presence of a symbol in a workstation, and to initiate automatically reading of the symbol.

An additional object of this invention is to shield laser light returning to a workstation head from ambient light of a high intensity.

A further object of this invention is to provide a versatile point-of-sale system of simple, miniature, lightweight, rugged construction.

Another object of this invention is to select the scan pattern from a plurality of scan patterns.

2. Features of the Invention

In keeping with these objects, and others which will become apparent hereinafter, one feature of this invention resides, briefly stated, in a point-of-sale system for reading indicia having parts of different light reflectivity, e.g. bar code symbols.

A movable electro-optical scanner includes means for propagating and directing a light beam, e.g. a laser beam, toward indicia located in the vicinity of a work surface exteriorly of the scanner. A detector means, e.g. a photodetector, is operative for detecting at least a portion of the light of variable intensity reflected off the indicia over a field of view, and for generating an electrical signal indicative of the detected light intensity. A processor means processes the electrical signal into data descriptive of the indicia being read. A scanning means is operative for scanning at least one of said light beam and said field of view.

The system further includes a terminal having means, e.g. a data store, for storing the data, and means, e.g. a display, for displaying the data. A cash register is a preferred one such terminal.

This invention proposes means for infinitely adjustably positioning the scanner relative to the work surface, and for at least temporarily maintaining the scanner in any selected one of an infinite number of adjusted orientations. Advantageously, the positioning means is a bendable, elongated, hollow arm connected at one end region to the scanner. The opposite end region of the arm can either be directly connected to the terminal, or indirectly connected to the terminal through a base unit on which the opposite end region of the arm is mounted.

Preferably, but not necessarily, the scanner generates and positions a multi-directional scan pattern over the work surface over which objects bearing symbols to be read are passed. An operator can orient the scanner at any desired position relative to the symbol.

Hence, the bendable arm enables the operator to specifically position the scanner over the working surface so that the distance between the scanner and the articles bearing the symbols to be scanned may be optimally adjusted. In practice, the operator will pass the articles bearing symbols to be scanned in a fairly rapid manner under a head of the scanner. The head will emit a laser beam scan pattern which covers the entire portion of the working surface so that the operator need not repetitively pass the article over a specific area such as an X-shaped slot formed in a countertop. As previously discussed, known slot-type scanners often require multiple passes of the article and symbol over a countertop slot in order to achieve an accurate registration of the symbol with respect to the scan pattern. Since the scan pattern in the present invention is, advantageously, a multi-directional pattern, there is a much higher probability that one of the scan lines will extend across the symbol regardless of the orientation of the article on the working surface. This invention also proposes selecting the scan pattern to suit a particular application.

The workstation described herein can have additional features to increase system versatility. For example, the workstation can include a keyboard and a display on the head to enable the operator to enter and see information relating to the object bearing the symbol. A magnetic stripe reader can be incorporated in the head by providing a slot through which a card having magnetically encoded data on a magnetic tape is passed. A tag deactuator can also be integrated with the workstation, e.g. in the base unit or the head unit, to deactivate a theft-deterrent tag affixed to the object.

Still another feature resides in a shroud or hood on the head in the vicinity of a return port through which the laser light reflected off the symbol passes en route to the photodetector. The hood acts to shield the photodetector from being overloaded by tending to block the detection of ambient light of a high intensity which otherwise would be detected by the photodetector.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
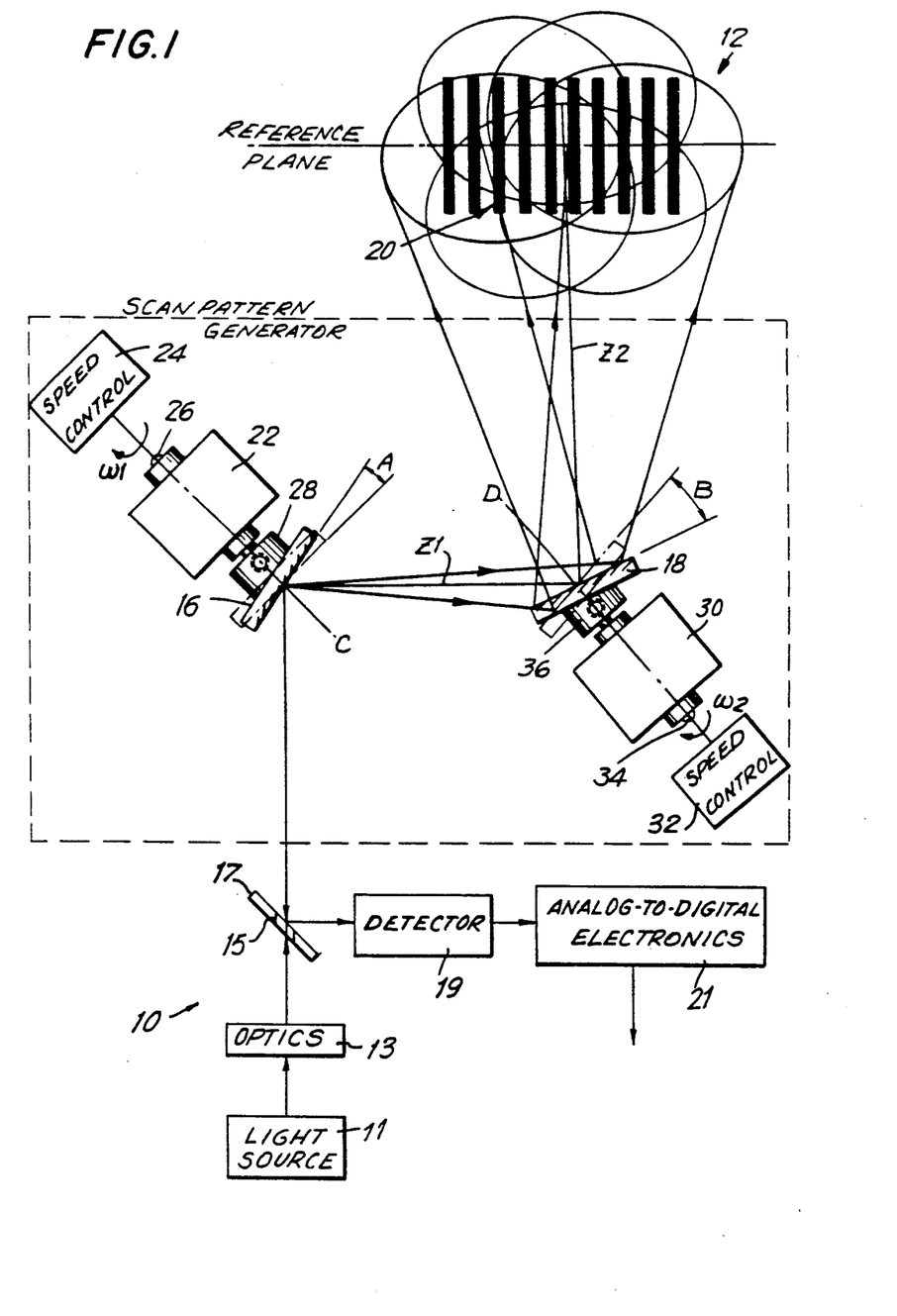
FIG. 1 is a diagrammatic view of one embodiment of an arrangement for generating a multi-directional scan pattern for use with an adjustable head at a workstation according to this invention.
Figure 2:
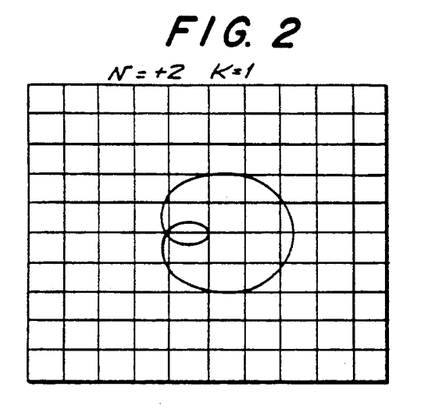
FIGS. 2-11 are multi-directional scan pattern examples generated by the embodiment of FIG. 1.
Figure 3:
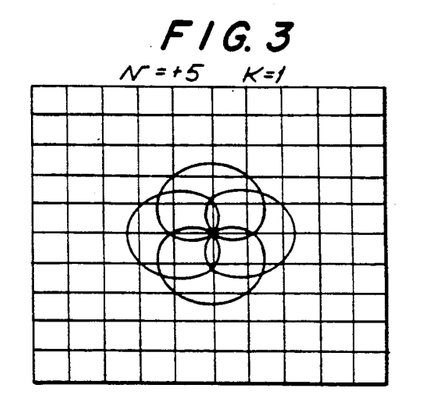
Figure 4:
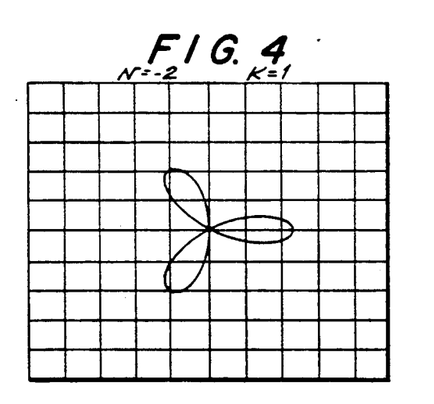
Figure 5:
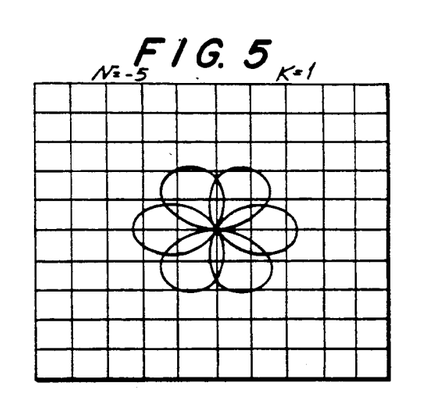
Figure 6:
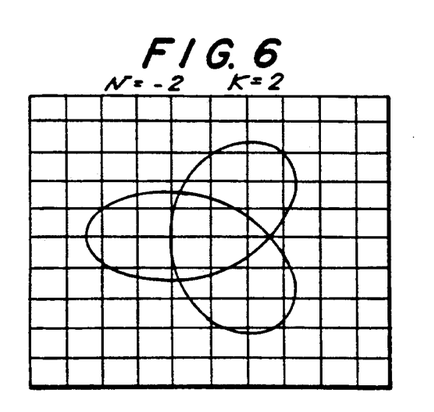

Referring to FIG. 1, reference numeral 10 generally identifies a multi-component arrangement for generating a multi-directional scan pattern 12 in a reference plane.

The arrangement 10 includes a light source 11, e.g. a gas laser, a semiconductor laser diode, a light emitting diode, etc. for generating a light beam. The light beam is directed along an optical path through an optical train 13 operative for optically modifying the light beam to have a predetermined cross-section or waist at the reference plane. The light beam exiting the optical train 13 is directed through a clearance hole 15 in an inclined mirror 17 to a first planar front surface mirror 16 from which the light beam is reflected along a first path portion of length Z1 to a second planar front surface mirror 18 from which the light is again reflected along a second path portion of length Z2 to a reference plane located away from the second mirror 18. The reference plane lies in a plane generally perpendicular to the optical path. However, for ease of illustration, the reference plane has been shown to lie in the plane of FIG. 1, whereas, in actuality, the reference plane lies in a plane normal to the plane of FIG. 1. A symbol 20 to be read is located in the vicinity of the reference plane.

The path portion Z2 is many times longer than path portion Z1 such that the inter-mirror path portion Z1 is, as a practical matter, negligible. In FIG. 1, the path portion Z1 is shown to have a non-negligible length, but this was done merely to better illustrate the invention.

Rather than, or in addition to, sweeping the symbol 20 with the light beam, the field of view of a detector 19 is swept in the scan pattern. The detector 19, e.g. a photodiode or analogous light sensor, is operative for sensing light of variable intensity reflected off the symbol 20, and for generating an electrical analog signal indicative of the sensed light. In this case, reflected light is collected along path portion Z2 (in a direction opposite to the illustrated arrows) for impingement on second mirror 18 and, thereupon, the impinging light is reflected along path portion Z1 (again in a direction opposite to the illustrated arrows) for impingement on first mirror 16 and, thereupon, the light is reflected off the inclined mirror 17 toward the detector 19.

Hence, either the symbol itself, or the field of view of the detector, is scanned with the scan pattern 12. In still another embodiment, both the symbol and the field of view are simultaneously scanned, and this simultaneous scanning is employed in retro-reflective scanners.

The analog signal from the detector 19 is converted by an analog-to-digital electronic converter 21 to a digital signal indicative of the symbol being scanned. This digital signal is then decoded into data descriptive of the symbol.

Further details concerning the light source 11, optical train 13, detector 19, analog-to-digital converter 21 can be had by reference to such prior art patents as U.S. Pat. Nos. 4,251,798; 4,360,798; 4,369,361; 4,387,297; 4,409,470; 4,460,120; 4,496,831; 4,593,186 and 4,758,717, all of which have been assigned to the assignee of the instant application, and are incorporated by reference herein.

In order to generate the scan pattern, according to one embodiment, the first 16 and second 18 mirrors are mounted on first and second rotator means at respective tilt angles A, B, and are rotated about respective axes C, D at respective angular speeds $\omega_1$, $\omega_2$.

Specifically, a reversible or unidirectional electrical motor 22 under the control of a speed controller 24 is operative to rotate output shaft 26 in either circumferential direction at angular speed $\omega_1$ about axis C. A support 28 is mounted at one end of shaft 26 for joint rotation therewith. The support has an outer inclined end on which the first mirror 16 is mounted, e.g. by adhesion, for joint rotation. The first mirror 16 is inclined at a first tilt angle of inclination A.

Similarly, a reversible or unidirectional electrical motor 30 under the control of a speed controller 32 is operative to rotate output shaft 34 in either circumferential direction at angular speed $\omega_2$ about axis D. A support 36 is mounted at one end of shaft 34 for joint rotation therewith. The support has an outer inclined end on which the second mirror 18 is mounted, e.g. by adhesion, for joint rotation. The second mirror 18 is inclined at a second tilt angle of inclination B.

In operation, the light beam reflected by the rotating first tilted mirror 16 describes a conical surface in space. Since the mirror 16 is tilted at angle A, the half-angle of the light cone extending between the mirrors is 2A. If the second mirror 18 were oriented normal to the optical axis of path portion Z1, then the locus of the light cone on the second mirror would be a circle. However, since the second mirror 18 is oriented at an angle to the optical axis of path portion Z2, the locus on the second mirror is an ellipse. Each point of the ellipse on the second mirror now serves as the point of origination of another cone. The net motion of both rotating mirrors produces multidirectional scan patterns, representative ones of which are shown in FIG. 2-11. As described below, the pattern itself is a function of the angular speeds, the directions of rotation, and the magnitudes of the inclination angles, as well as the length of the optical path.

For ease of description, the letter N denotes the ratio of the angular speed of the second mirror to that of the first mirror; the letter K denotes the ratio of the magnitude of the inclination angle of the second mirror to that of the first mirror; a + sign in front of the letter N indicates that both mirrors rotate the beam in the same direction; and a − sign in front of the letter N indicates that both mirrors rotate the beam in opposite directions; and the letter Z indicates the total distance along the optical path from the first mirror to the reference plane (Z=Z1+Z2; Z2>>Z1).

If N is positive and an integer, then the scan pattern is closed on itself and is characterized by interior loops, the number of loops being (N+1). The longest dimension of the pattern P=(4A+4B)Z. Attention is drawn to FIGS. 2 and 3 for the cases where N= +2 and +5, and where K=1.

If N is negative and an integer, then the scan pattern is still closed, but is characterized by exterior petals, the number of petals being (N+1). The longest dimension of the pattern P=(4A+4B)Z. Attention is drawn to FIGS. 3 and 4 for the cases where N=−2 and −5, and where K=1.

Changing the magnitude of the tilt angles, in turn, changes the overall size and longest dimension of the pattern. Attention is drawn to FIGS. 6 and 7 for the cases where N=−2 and 5, and where K=2. Hence, by doubling the tilt angle ratio, as compared to FIGS. 4 and 5, the overall longest dimension of the scan pattern is correspondingly increased.

If N is not an integer, then the pattern is not closed, but is open.

Figure 7:
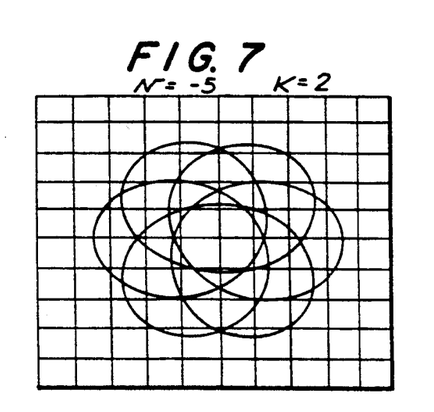
Figure 8:
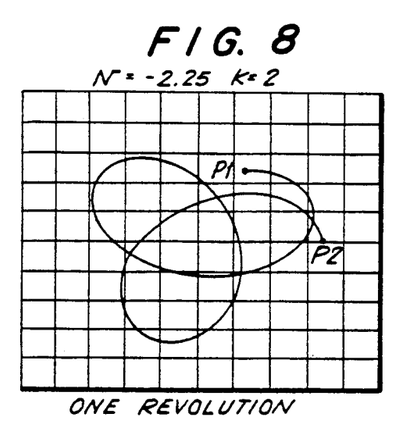
Figure 9:
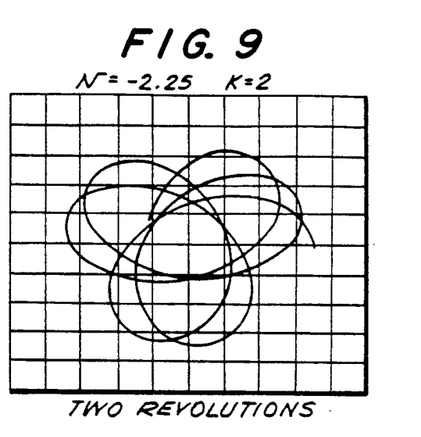
Figure 10:
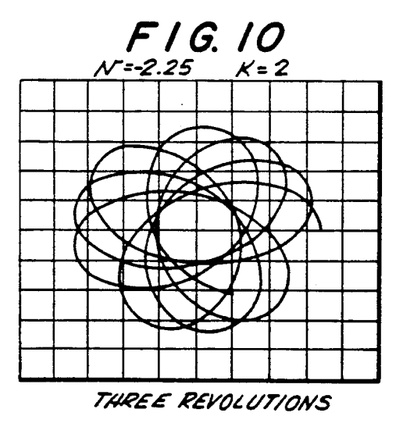
Figure 11:
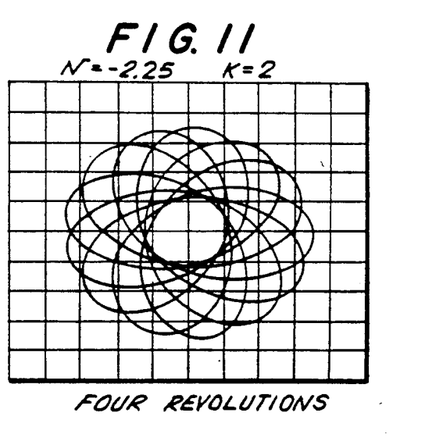

FIG. 8 shows the case where N=−2.25 and K=2. The scan is open, i.e. does not close upon itself as in FIGS. 2-7. Note that points P1 and P2 representing the beginning and end points of the pattern are spaced apart. During the first revolution of the slower mirror 16 or 18, the scan starts at point P1, traces the pattern shown in FIG. 8 and ends at point P2. During the second revolution of the slower mirror, the same scan pattern is traced, this time the entire scan pattern being precessed about an axis normal to the reference plane by an angular distance equal to the fractional part of N multiplied by 360°. Thus, in this case where the fractional part =0.25, then the angular distance of the precessing equals $0.25 \times 360° = 90°$. Hence, it will take four revolutions of the slower mirror to close the pattern, and this is shown in FIG. 11. FIG. 10 shows the precessed pattern after the third revolution of the slower mirror, and FIG. 11 shows the precessed pattern after the fourth revolution of the slower mirror.

As described earlier, the size of the scan pattern is determined by the tilt angles of the mirrors and the distance between the second mirror and the symbol. For small tilt angles, the size of the scan pattern equals (4A+4B)Z. For example, if A=B=4° (0.07 radians) and if Z=7", the size of the scan pattern is 4.4" which is slightly longer than the longest bar code symbol.

The tilt angles can be fixed or adjustable. For example, a set of supports similar to supports 28, 36 can be provided, with each support having an inclined end pre-set to a different angle. A user would then select the appropriate support for a particular application.

Figure 12:
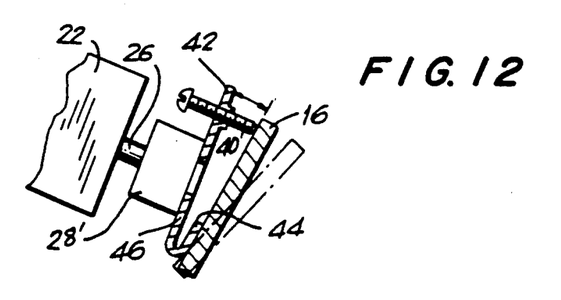
FIG. 12 is an alternative tilt angle adjusting arrangement for use with the embodiment of FIG. 1.

Otherwise, as shown in FIG. 12, mirror 16 is adjustably set to any desired tilt angle by turning adjusting screw 40 whose free end bears against one side of a rear surface of mirror 16. The screw is threaded in a radial flange 42 mounted on a support 28'. The opposite side of the rear surface of mirror 16 is connected to one leg 44 of a hinge whose other leg 46 is mounted on the cylinder 28'.

The speed controllers 24, 32 are conventional speed control systems. If motors 22, 30 are DC motors, then their speeds can be very accurately varied by the application of a variable control voltage. With constant excitation or energization of the field windings of a shunt motor, the speed is largely dependent on the voltage of the field current supplied to it. By means of a field rheostat, the voltage of the current supplied to the motor can be adjusted to obtain "infinitely variable" speed control and also to reverse the direction of rotation, this being done by reversing the direction of the field current.

Other than such analog-type controls, digital-type controllers can also be employed to cause the motors to run at discrete speeds, each speed determined by the magnitude of a control voltage or current. Such discrete speeds can be switched in and out of operation by one or more switches advantageously mounted on the system and within ready access of a user. For example, the manual actuation of one momentary action switch on a hand-held head in a laser scanning system can cause the speeds and rotation directions to be set to generate the precessing scan pattern depicted in FIGS. 8-11, and the manual actuation of another such switch on the head can cause the generation of the scan pattern of FIG. 7. The choice of the pattern depends on the application. Of course, rather than the manual actuation of switches, the scan patterns can be automatically generated in a predetermined sequence. For example, a microprocessor can be programmed to automatically change the speeds and rotation directions in a certain sequence at the onset of symbol reading. Thus, the patterns of FIGS. 2-7 could be successively generated in sequence, or in any order, or with any combination of individual patterns repeated until eventually the symbol has been successfully scanned and read.

The linear speed of a beam spot traveling along any of the above scan patterns is an important system parameter in symbol reading applications because. it determines the response time of the signal processing and decoding electronic circuitry operative for processing the electrical signals generated by the detector into data descriptive of the bar code symbol. The spot speed is a complex function of the angular speeds $\omega_1$, $\omega_2$, the tilt angles A,B and the distance Z. For the above-described multidirectional patterns, the spot speed changes sinusoidally as the spot travels along a pattern. The linear spot speed due to each mirror is determined by:

V(inches/sec)=$2\pi\omega$(rev/sec) R (inches) where R is the radius of a circle produced by either mirror.

If V1 and V2 are the linear spot speeds provided by first mirror 16 and second mirror 18, respectively, then the maximum speed $V_{MAX}$ within the pattern is ($V_1+V_2$) and the minimum speed $V_{MIN}$ within the pattern is ($V_2-V_1$) Assuming that $V_2 >> V_1$, the average spot speed is $V_2$.

As a numerical example, assume that $\omega_2=60$ rev/sec and $\omega_1=15$ rev/sec. Further, assume that each mirror describes a circle of radius equal to 1.5 inches, and that the mirrors counterrotate. The scan pattern will have (N+1)=5 petals. The size of the scan pattern will be about 6 inches. The spot speed $V_1=141$ in/sec. The spot speed $V_2=565$ in/sec The average spot speed is $V_2=565$ in/sec. $V_{MAX}$ is $V_1+V_2=706$ in/sec. $V_{MIN}$ is $V_2-V_1=424$ in/sec.

The above numerical example represents a preferred laser scanning application for reading bar code symbols using relatively low speed analog signal processing and decoding circuitry The above spot speed variation between $V_{MAX}$ and $V_{MIN}$ is less than that normally encountered in linear scan or Lissajous scan patterns.

Typically, the higher the spot speed, the more complex and expensive will be the signal processing and decoding circuitry since the circuitry must respond to the maximum spot speed. The lower spot speed achieved by this invention compared to the known art permits simpler, less expensive electrical circuitry to be employed. Also, the average spot speed for a given number of frames per second is less according to this invention than in the known designs.

Also, the two-mirror arrangement of this invention has no "dead" time. The spot is always in the scan pattern. There are no locations at which the beam spot speed equals zero, as is the case for scanners of the type described in U.S. Pat. Nos. 4,387,397 or 4,409,470 or 4,369,361, for example.

In principle, all the portions of the scan pattern can be used for decoding. As shown in FIG. 7, for example, there are portions of the pattern with relatively straight and gently curved lines useful for decoding provided the radius of curvature of the line is such that the line covers at least one-half of the symbol.

In addition, as shown in FIG. 7, the scan pattern of this invention has an N-fold symmetry, and a 100% scanning efficiency. The pattern is equally and highly dense over the field of view. There are fewer non-useful, tightly curved pattern portions, as was the case for Lissajous patterns. There are more useful, gently curved pattern portions having large radii of curvature, each capable of scanning a symbol and/or the field of view of a detector.

The two-mirror scan pattern generator shown in FIG. 1 is a non-complicated, lightweight, miniature arrangement for generating fairly complex multi-directional scan patterns. All of the components shown in FIG. 1 can be packaged in a hand-held head for reading bar code symbols (as shown, for example, in U.S. Pat. No. 4,387,297 or 4,409,470), or in a desk-top workstation (as shown, for example, in U.S. Pat. No. 4,369,361). It can be easily packaged underneath a countertop in a retail, point-of-sale application. It can be easily packaged in a workstation whose head is supported on an adjustable gooseneck-type support above a work surface in a scan-above or sidescan mode, as described below in connection with FIGS. 14 and 15.

Figure 13:
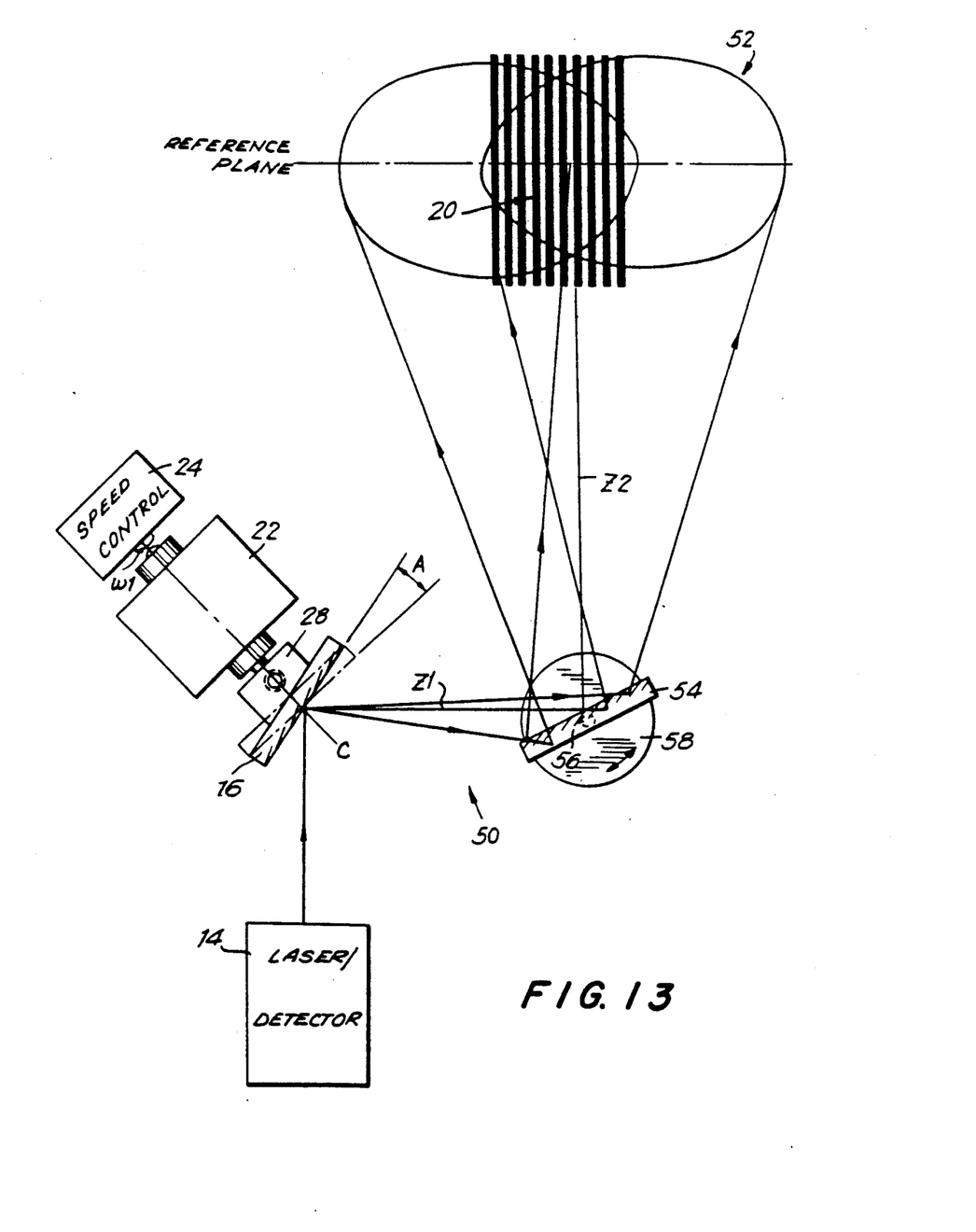
FIG. 13 is a diagrammatic view of another embodiment of another arrangement for generating a scan pattern for use with an adjustable head of a workstation according to this invention.

In a modification of the FIG. 1 embodiment, FIG. 13 shows another embodiment 50 for generating a scan pattern 52, which is identical to embodiment 10, except that the second rotator has been replaced by a scanner element of the type described in U.S. Pat. No. 4,496,831, the entire contents of which are incorporated by reference herein. It will be noted that a second planar, front surface, mirror 54 is mounted on, and in a plane parallel to, an output shaft 56 of a reciprocating motor 58. The mirror 54 is respectively oscillated in the directions of the double-headed arrow. The ellipse formed on mirror 54 is then moved linearly across the symbol 20 between the two end traces shown.

The scan patterns generated by this invention can be used not only for bar code reading applications, but also in search systems, visual entertainment systems, precision pointing, etc.

Rather than mirrors, prisms or analogous optical elements arranged to direct the light beam along the optical path may be utilized.

The precessing pattern, which rotates in space about an axis generally perpendicular to the plane in which the symbol lies (see FIGS. 8-11) is of particular advantage in those applications where the symbol is stationary, or where the height of the symbol is truncated. The space-rotating pattern minimizes the tendency for the symbol not to be scanned, since during the rotation of the pattern, the likelihood increases that at least one of the scan lines of the pattern will cross the symbol. This is to be contrasted with Lissajous patterns which have a translating wave characteristic.

Figures 14, 18:
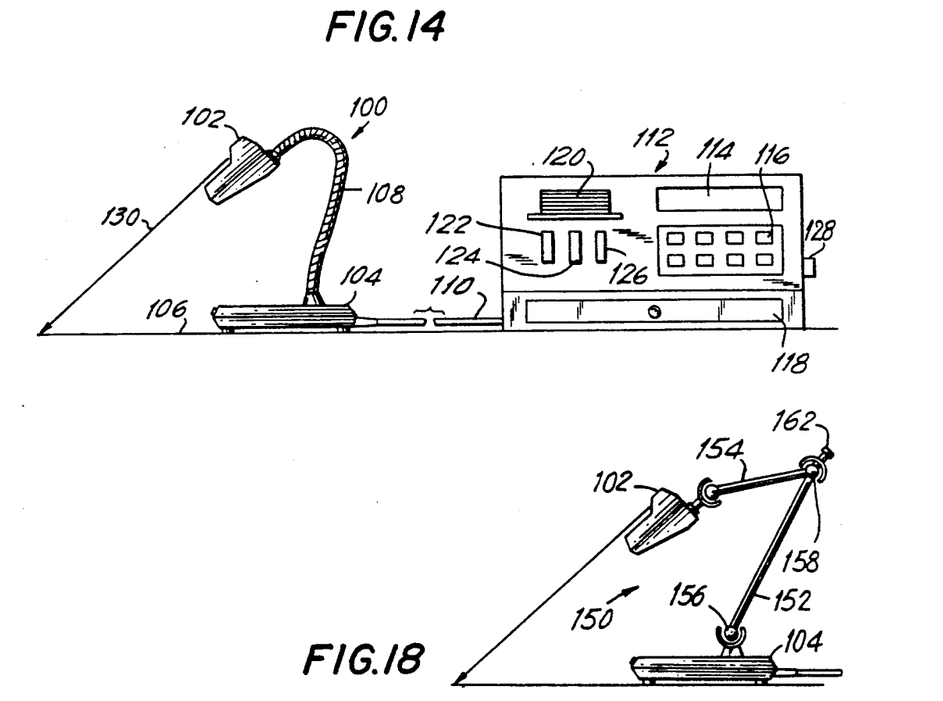
FIG. 14 is a side view of one embodiment of a workstation connected to a terminal according to this invention.
FIG. 18 is a side view of still another modified workstation.

Turning now to FIG. 14, as previously mentioned, all of the components shown in FIG. 1 can be mounted within a workstation 100 having a head 102, a base 104 supported on a countertop or like support surface 106, and an adjustable gooseneck-like conduit or arm 108, one end of which is connected to the head 102, and the opposite end of which is connected to the base 104. The arm 108 is hollow so that electrical wires can be routed therethrough to conduct electrical signals to and away from the components within the head 102. The arm is constituted of a semi-rigid, metal material capable of being repeatedly manually bent to a selected orientation and, when so bent, capable of staying in said selected orientation until re-bent by an operator to another orientation. By bending the arm, the head 102 is infinitely adjustably positioned relative to a symbol located in the vicinity of a work surface exteriorly of the scanner. The work surface or reference plane can be located at, or slightly above, the plane of the countertop 106, or can be located at, or slightly above, the plane of the upper surface of the base 104.

An electrical cable 110 connects the workstation to a terminal 112 which is shown, for convenience, as a cash register in a POS installation. The terminal 112 has a display 114 for displaying information, including data descriptive of the symbol being scanned, to an operator; a keyboard 116 for enabling the operator to manually enter information, including data descriptive of the symbol being scanned; a cash drawer 118 for holding money; a paper tape 120 for recording information and providing a receipt to a customer of the purchase of an object bearing the symbol being scanned; a recharger 122 for recharging and supplying electrical power to a battery mounted either within the base 104 or the head 102; a decode module 124 (in case the decode module is not located within the base 104, arm 108, or head 102); and local data storage means 126 (in case the local data storage means is not located within the base 104, arm 108 or head 104). The data stored within terminal 112 can be unloaded via connector 128 to a host computer. The entire installation shown in FIG. 14 is known as an intelligent terminal. The arm 108 can be manipulated with multiple degrees of freedom of movement to insure that the exiting laser beam (depicted by the arrow 130) strikes the symbol and/or the returning reflected light is collected from the symbol.

Figure 15:
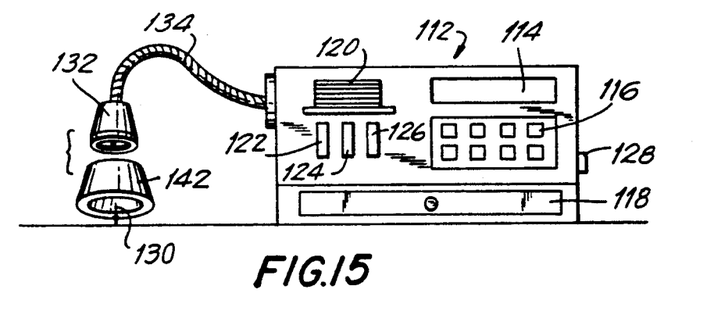
FIG. 15 is a side view of another embodiment of a workstation connected to a terminal according to this invention, together with a shroud accessory.

The intelligent terminal shown in FIG. 15 has the same register 112. A head 132 has a bell- or lamp-like shape. A shroud or hood 142, as described below, is mounted on the head 132. The arm 134 has its opposite end not connected to any base, but, instead, directly connected to the register 112. The intelligent terminal of FIG. 15 is intended as a permanent scanning installation.

The laser scanning heads of FIGS. 14 and 15 are of the retro-reflective type wherein the outgoing incident laser beam, as well as the field of view of the sensor means, are scanned. It will be readily understood that other variants also are within the spirit of this invention. For example, the outgoing incident laser beam can be directed to, and swept across, the symbol through one window on the head, while the field of view is not scanned and the returning laser light is collected through another window on the head. Also, the outgoing incident beam can be directed to, but not swept across, the symbol, while the field of view is scanned.

The terminal need not be a cash register, but may be a harness-supported or hand-held box which is connectable to the head.

Figure 16:
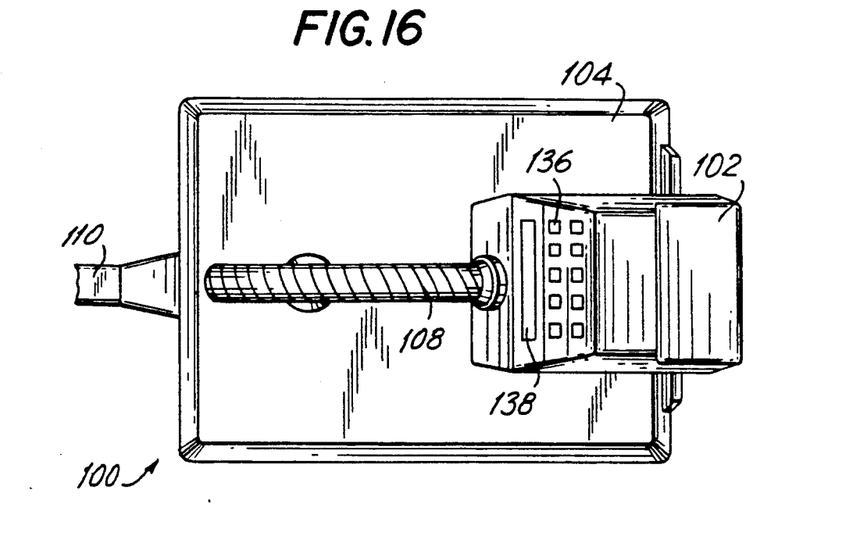
FIG. 16 is an enlarged top view of a modified workstation.

Each head may further include, as best shown in FIG. 16, an on-board keyboard 136 and an on-board display 138 for respectively entering and displaying information relating to the symbol being scanned.

Figure 17:
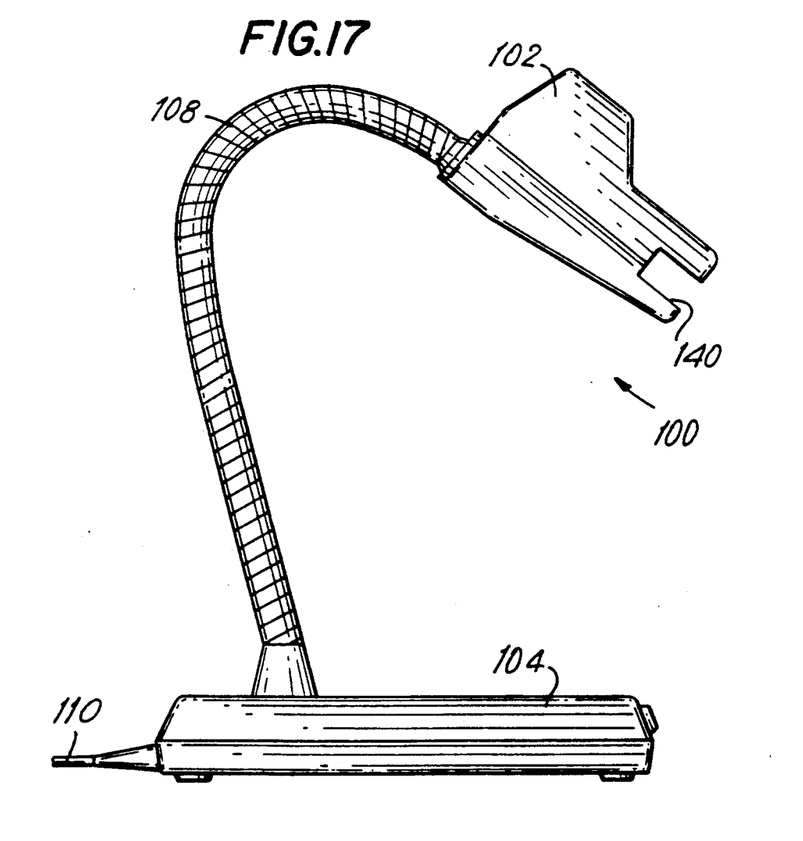
FIG. 17 is an enlarged side view of another modified workstation.

In another variant, each head, as best shown in FIG. 17, may further include a slot 140 through which credit cards having a magnetic stripe pass. A magnetically-encoded data reader is located within the head, and is operative to read the encoded data on the credit card.

The cash register terminal 112 shown in FIG. 14 need not be located on the same countertop as the workstation 100, but can be located remotely therefrom on another support surface and can even be located underneath the base 104.

One of the key features of the present invention is that the bendable arm 108 enables the operator to specifically position the scanner head over the working surface so that the distance between the head and the articles bearing the symbols to be scanned may be optimally adjusted. In practice, the operator will pass the articles bearing symbols to be scanned in a fairly rapid manner under the scanning head. The head will emit a laser beam scan pattern which covers the entire portion of the working surface so that the operator need not repetitively pass the article over a specific area such as an X-shaped slot formed in a countertop. Known slot-type scanners often require multiple passes of the article and symbol over a countertop slot in order to achieve an accurate registration of the symbol with respect to the scan pattern. Since the scan pattern in the present invention is, advantageously, a multi-directional pattern, there is a much higher probability that one of the scan lines will extend across the symbol regardless of the orientation of the article on the working surface.

Another feature of the present invention is known as the automatic object sensing feature. Since the scanner workstation is intended to operate in a hands-free mode, it is important in the design of the present invention that the scanning take place continuously. When a bar code symbol is detected in the workstation, typically by interruption of an infrared beam, and correctly decoded, the data representative of the symbol is automatically entered into the POS terminal, and an indicator alerts the operator that a successful read has occurred. Although the scan lines will still continue to scan the bar code symbol on the article while the article is in the workstation, an inhibiting signal is generated after a successful read to prevent the same symbol from being read a multiple number of times.

Still another feature relates to the shroud 142 (FIG. 15) mounted on the head to shield the on-board photodetector from being overloaded by an overly intense ambient light. The photodetector will, of course, detect all light incident thereon, including the information-bearing light reflected off the symbol and the ambient light which enters the head through the same return port that the reflected laser light passes. The ambient light represents non-useful information, i.e. noise, and the shroud, by at least partially blocking the ambient light from entering the return port, minimizes the noise and increases the overall signal-to-noise ratio of the analog signal generated by the photodetector. The shroud is advantageously composed of a light-blocking material opaque to ambient light.

FIG. 18 shows another workstation 150 analogous to that shown in FIG. 14, except that, rather than a bendable arm, the head 102 is infinitely adjustable, at least in a limited range, by a pair of rigid arms 152, 154 having ball joints 156, 158, 160 at their ends to permit universal movement of the arms relative to each other. The arms may be frictionally retained in an adjusted position, or a positive lock, e.g. manually-operated lock 162, may be employed to fix the arms in a selected position.

Figure 19:
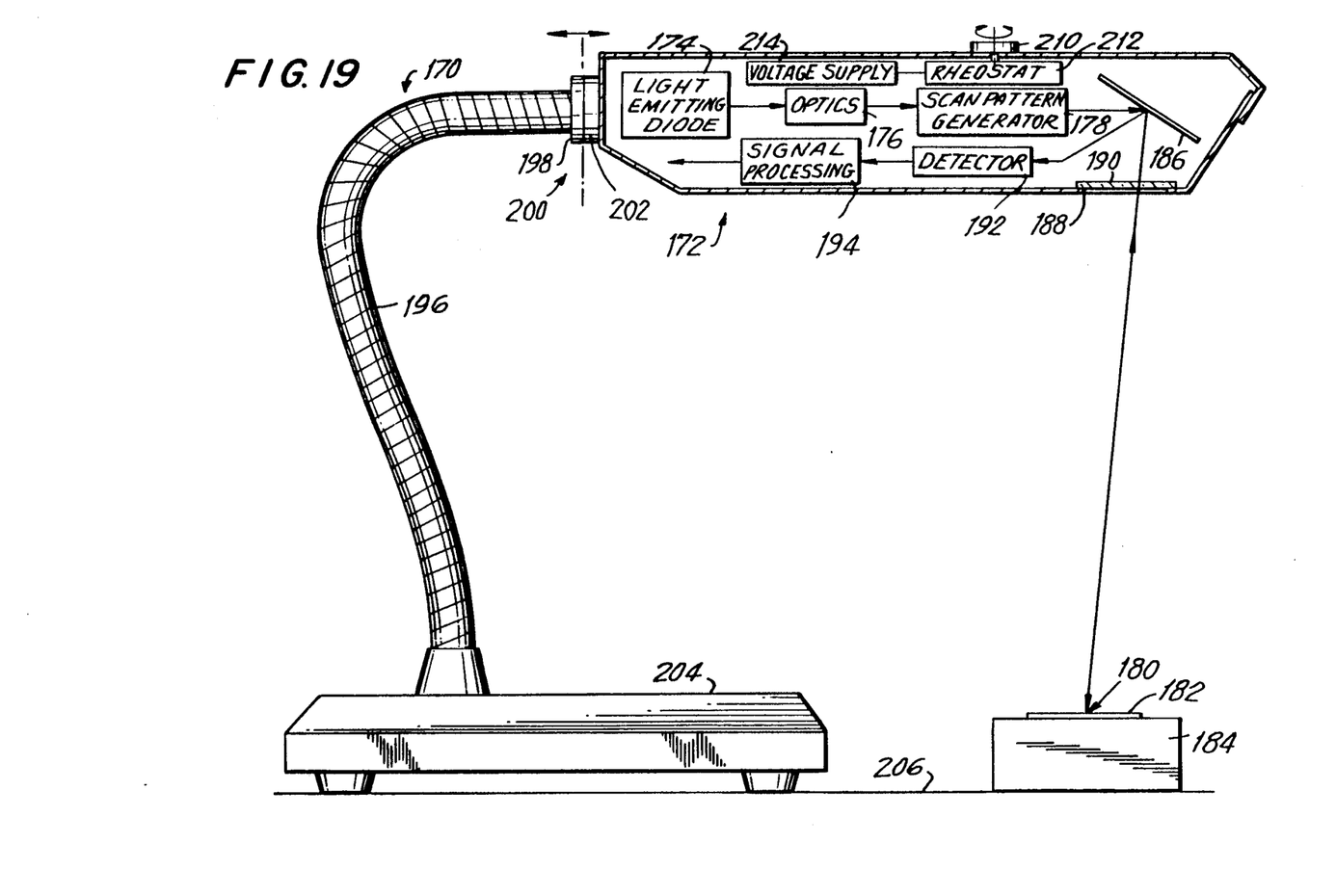
FIG. 19 is a schematic side view of yet another modified workstation.
Figure 20:
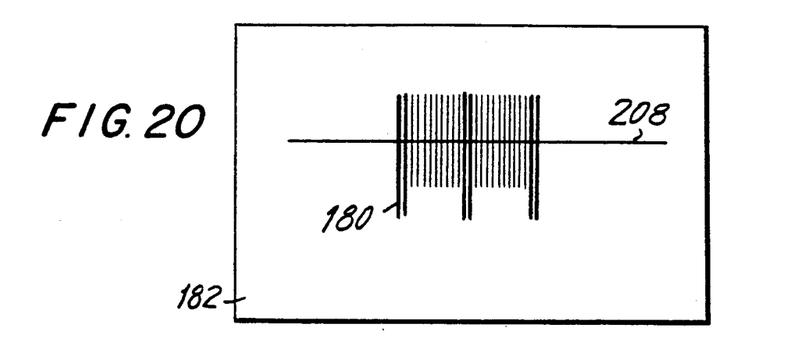
FIG. 20 is a top view of a single scan line pattern on a symbol.

FIG. 19 shows another workstation 170 having a head 172 in which a light source 174, such as a light emitting diode or a laser diode, is mounted; an optical train 176 for optically modifying the light beam propagated by the light source 174; and a scan pattern generator 178, such as described above in connection with FIG. 1 or FIG. 13, for scanning a symbol 180 (see FIG. 20) printed on a label 182 mounted on an object 184 identified by the symbol. The light beam reflects off a folding mirror 186 through an exit port 188 covered by a window 190 to the symbol. Light reflected off the symbol 180 that passes through the window 190 is reflected by the folding mirror 186 to a photodetector 192 whose analog electrical signal output is fed to a signal processor 194 wherein the analog signal is digitized and decoded in a manner known in the art. A CCD detector could also be employed.

The head 172 is detachably connected to a bendable arm 196 as previously described. One end of the arm 196 supports one part 198 of an electro-mechanical connector 200 whose mating part 202 is supported by the head 172. Thus, the head 172 can be removed, and replaced or repaired. The other end of the arm 196 is connected to a base 204 that rests on a support surface 206. The outgoing light beam is directed at the symbol 180 placed underneath the head 172 by adjusting the position and orientation of the head.

Figure 21A:
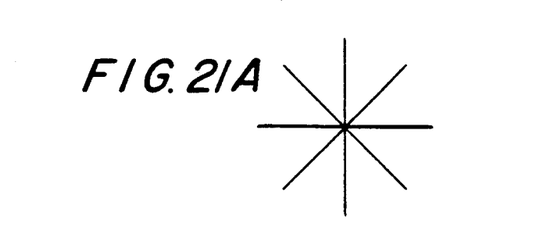
FIGS. 21A-21E are top views of other scan patterns.
Figure 21B:
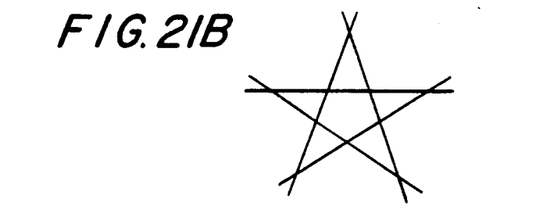
Figure 21C:
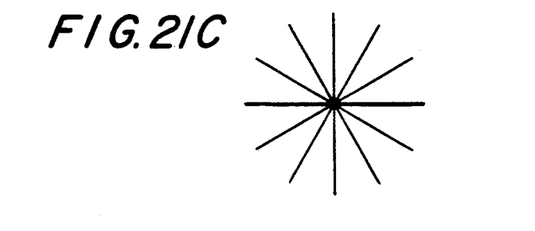
Figure 21D:
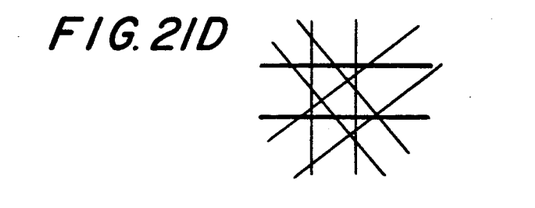
Figure 21E:
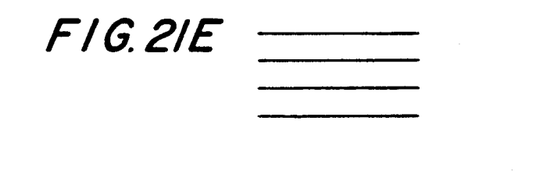

The scan pattern generated by the scan pattern generator 178 can be a single line 208 (FIG. 20), a set of intersecting lines such as the four-line asterisk pattern of FIG. 21A, the star pattern of FIG. 21B, the six-line asterisk pattern of FIG. 21C, the angularly offset, superimposed tic-tac-toe patterns of FIG. 21D, the set of generally parallel scan lines of FIG. 21E, the curvilinear patterns of FIGS. 2-11, etc.

In the case where the scan pattern generator 178 is as shown in FIG. 1, the various patterns of FIGS. 2-11 are generated by rotating a scan selector knob 210 to a selected angular position. The angular extent of the rotation of the knob 210 corresponds to the displacement of a wiper arm on a rheostat 212 which is supplied by voltage from a power supply 214. The magnitude of the voltage fed to the speed controls 24, 32 of the generator 178 dictates which scan pattern is generated, as described above.

Rather than a rotary knob 210, any form of manual, or even automatic, control can be used to change the scan pattern, either prior to, or during, reading. Other than voltage-controlled speed controls, the scan pattern can be changed by other means. For example, the number of folding mirrors surrounding a central rotating mirror, as taught, for example, in U.S. Pat. No. 4,816,661, can be changed by manual or automatic controls. The selection of scan pattern can also be accomplished by software stored in a system microprocessor either on-board the scanner or located remotely therefrom.

The workstation 170 is also known as a scan lamp. In a retail setting such as a supermarket, or the like, multiple lamps are arranged at the check-out counters. Additional lamps are provided at special in-store centers such as the meat, pharmacy, floral, fish, bakery, appetizing departments. Additional lamps may be provided at the receiving or production departments, or on the sales floor for inventory or electronic article surveillance purposes. All of the lamps are operatively connected to a central control center for an integrated system.

It will be understood that each of the elements described above, or two or more together, also may find a useful application in other types of constructions differing from the types described above.

While the invention has been illustrated and described as embodied in a point-of-sale system including infinitely adjustable optical scanner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A point-of-sale system for reading indicia having parts of different light reflectivity, comprising:
   (A) a movable electro-optical scanner including
      (i) means for propagating and directing a light beam toward indicia located in the vicinity of a work surface exteriorly of the scanner,
      (ii) means for detecting at least a portion of light of variable intensity reflected off the indicia over a field of view, and for generating an electrical signal indicative of the detected light intensity,
      (iii) means for processing the electrical signal into data descriptive of the indicia being read, and
      (iv) means for scanning at least one of said light beam and said field of view in a scan pattern extending over the indicia;
   (B) means for adjustably positioning the scanner and the light beam relative to the work surface, and for at least temporarily maintaining the scanner in a selected adjusted orientation during reading; and
   (C) user-selected means for selecting the scan pattern to be one of a plurality of predetermined scan patterns operative for reading the indicia.

2. The point-of-sale system according to claim 1, wherein the positioning means includes a bendable, elongated arm connected to the scanner.

3. The point-of-sale system according to claim 2, wherein the bendable arm is constituted of a semi-rigid material capable of being repeatedly bent.

4. The point-of-sale system according to claim 2, wherein the bendable arm is a hollow tube in which electrical wires connected to the scanner are routed.

5. The point-of-sale system according to claim 2, wherein the scanner includes a head detachably mounted at one end of the arm.

6. The point-of-sale system according to claim 1; and further comprising a terminal including means for storing the data, means for displaying the data, and means for entering information relating to the indicia.

7. The point-of-sale system according to claim 1, wherein the scanner includes a head in which the directing means, detecting means, processing means and scanning means are contained; and wherein the scanner also includes a base unit mounted on the work surface; and further comprising a stationary cash register connected to the base unit; and means for entering information relating to the indicia on at least one of said head and said cash register.

8. The point-of-sale system according to claim 1, wherein the directing means includes a light emitting diode.

9. The point-of-sale system according to claim 1, wherein the scan pattern is a single scan line.

10. The point-of-sale system according to claim 1, wherein the scan pattern is a set of generally parallel scan lines.

11. The point-of-sale system according to claim 1, wherein the scan pattern is a set of intersecting scan lines.

12. The point-of-sale system according to claim 1, wherein the scan pattern is omni-directional.

13. The point-of-sale system according to claim 1, wherein the scan pattern is curvilinear.

14. The point-of-sale system according to claim 1, wherein the user-select means is operatively connected to the scanning means for manually changing the scan pattern.

15. The point-of-sale system according to claim 1, wherein the scanner includes means for decoding magnetically-encoded data.

16. The point of sale system according to claim 15, wherein the scanner includes a housing having a slot through which a card bearing magnetically encoded data is passed.

17. A point-of-sale system for reading indicia having portions of different light reflectivity, comprising:
   (A) a workstation including
      (i) a head,
      (ii) light source means in the head, and operative for emitting a light beam,
      (iii) optical means in the head, and operative for optically modifying and directing the light beam along an optical path toward the indicia located in the vicinity of a reference plane exteriorly of the head,
      (iv) sensor means supported by the head, said sensor means having a field of view and being operative for detecting at least a portion of light of variable intensity reflected off the indicia, and for generating an electrical analog signal indicative of the detected light intensity,
      (v) scanning means for scanning at least one of said light beam and said field of view in a scan pattern across the indicia,
      (vi) processing means in the head, and operative for converting the analog signal to a digital signal indicative of the indicia being read, and
      (vii) conductor means operative for conducting the digital signal away from the head;
   (B) a terminal operatively connected to the head and including
      (i) display means for displaying data descriptive of the indicia being read,
      (ii) keyboard means for enabling an operator to enter information relating to the indicia being read, and
      (iii) data storage means for storing the data descriptive of the indicia being read;
   (C) decode means located in at least one of said workstation and said terminal, and operative for decoding the digital signal into the data descriptive of the indicia being read;

(D) a rechargeable power supply located in at least one of said workstation and said terminal, and operative for supplying electrical power to the head;

(E) read-control means located in at least one of said workstation and said terminal, and operative for initiating reading of the indicia, and for terminating reading of the indicia upon a successful determination that the indicia has been successfully read;

(F) means for adjustably positioning the head relative to and above a work surface in the workstation, and for at least temporarily maintaining the head in a selected adjusted orientation, including a bendable, elongated arm connected to the head; and (G) user-select means for selecting the scan pattern to be one of a plurality of predetermined scan patterns operative for reading the indicia.

18. The system as recited in claim 17, wherein the workstation includes a base supported on a support surface, and wherein the arm is a hollow, elongated conduit having one end connected to the head, and an opposite end connected to the base, said bendable conduit having multiple freedoms of movement.

19. The system as recited in claim 18, wherein the conductor means includes a wire routed through the interior of the conduit.

20. The system as recited in claim 17, wherein the terminal is a cash register.

21. The system as recited in claim 17, wherein the arm is an elongated, hollow conduit having one end connected to the head and an opposite end connected to the terminal, said bendable conduit having multiple freedoms of movement.

22. The system as recited in claim 21, wherein the conductor means includes a wire routed through the interior of the conduit.

23. The point-of-sale system according to claim 17, wherein the head includes means for decoding magnetically-encoded data.

24. The point-of-sale system according to claim 23, wherein the head has a slot through which a card having magnetically-encoded data is passed.

25. A method of reading indicia having parts of different light reflectivity, comprising the steps of:

(a) propagating and directing a light beam toward indicia located in the vicinity of a work surface exteriorly of a movable electro-optical scanner;

(b) detecting at least a portion of light of variable intensity reflected off the indicia over a field of view, and generating an electrical signal indicative of the detected light intensity;

(c) processing the electrical signal into data descriptive of the indicia being read;

(d) scanning at least one of said light beam and said field of view in a scan pattern extending over the indicia;

(e) adjustably positioning the scanner and the light beam relative to the work surface, and at least temporarily maintaining the scanner in a selected adjusted orientation during reading; and (f) selecting the scan pattern to be one of a plurality of predetermined scan patterns operative for reading the indicia.

26. The method as recited in claim 25, wherein the selecting step is performed manually.

27. The method as recited in claim 26, wherein the scanning step is performed by a scan pattern generator capable of producing multiple scan patterns, and wherein the selecting step includes manually operating a selector operatively connected to the pattern generator.

28. The method as recited in claim 27, wherein the selecting step includes adjusting the electrical power supplied to the pattern generator upon manual operation of the selector.

29. The method as recited in claim 25, wherein the scanning step is performed by a scan pattern generator capable of producing a single line pattern and a multiple line pattern, and wherein the selecting step is performed by selecting one of said patterns.

30. The method as recited in claim 25, wherein the selecting step is performed prior to the positioning step.

31. The method as recited in claim 25, wherein the selecting step is performed subsequent to the positioning step.

32. The method as recited in claim 21; and further comprising the step of decoding magnetically-encoded data.

33. The method as recited in claim 32, wherein the decoding step is performed by passing a card bearing magnetically-encoded data through a slot formed in the scanner.

* * * * *